(12) United States Patent
Ding et al.

(10) Patent No.: US 6,541,568 B1
(45) Date of Patent: Apr. 1, 2003

(54) POLYOLEFIN MATERIALS HAVING ENHANCED SURFACE DURABILITY

(75) Inventors: Ruidong Ding, Arlington, TX (US); Satchit Srinivasan, Carrollton, TX (US); Edmund K. Lau, Arlington, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 59 days.

(21) Appl. No.: 09/575,660

(22) Filed: Jun. 1, 2000

(51) Int. Cl.⁷ .............................................. C08L 47/00
(52) U.S. Cl. ........................ 525/88; 525/97; 525/99; 525/191; 525/232; 525/236; 525/240; 525/241
(58) Field of Search ........................... 525/240, 88, 97, 525/99, 191, 232, 236, 241

(56) References Cited

U.S. PATENT DOCUMENTS

| | | | |
|---|---|---|---|
| 4,904,725 A | * 2/1990 | Himes | |
| 4,945,005 A | 7/1990 | Aleckner, Jr. et al. | 428/500 |
| 4,981,896 A | 1/1991 | Okada et al. | 524/413 |
| 4,997,720 A | 3/1991 | Bourbonais et al. | 428/500 |
| 5,095,063 A | 3/1992 | Okada et al. | 524/413 |
| 5,286,791 A | * 2/1994 | DeNicola, Jr. et al. | 525/71 |
| 5,324,755 A | * 6/1994 | Kilius et al. | 523/214 |
| 5,498,671 A | 3/1996 | Srinivasan | 525/240 |
| 5,571,581 A | 11/1996 | Koizumi et al. | 428/31 |
| 5,750,612 A | * 5/1998 | Zyagawa et al. | |
| 6,248,850 B1 | * 6/2001 | Arai | 526/347 |

FOREIGN PATENT DOCUMENTS

| | | |
|---|---|---|
| EP | 0704482 | 4/1996 |
| EP | 0 921 152 A2 | 6/1999 |
| JP | 5051500 | 3/1993 |
| JP | 6329850 | 11/1994 |
| JP | 9030339 | 2/1997 |
| JP | 11291420 | 10/1999 |
| WO | WO 93/21269 | 10/1993 |
| WO | WO 96/25292 | 8/1996 |
| WO | WO 99/24479 | 5/1999 |

OTHER PUBLICATIONS

Ono, CAPLUS AN 1999:683129, Oct. 1999.*

* cited by examiner

*Primary Examiner*—Jeffrey Mullis
(74) *Attorney, Agent, or Firm*—Winston & Strawn

(57) ABSTRACT

Thermoplastic polymer blends and formed articles made thereof which exhibit superior physical properties such as a combination of excellent scratch resistance, rigidity and impact toughness. The thermoplastic polyolefin blend includes from about 40 percent to about 80 percent of a base component of propylene-containing polymer; from about 5 percent to about 30 percent of a toughening component; and from about 3 percent to about 40 percent of a thermoplastic elastomer, preferably of a high styrene containing block or random copolymer. A preferred thermoplastic polyolefin blend includes between about 50 percent to about 70 percent of the base component; between about 10 percent to about 20 percent of the toughening component; and between about 5 percent to about 20 percent of the styrene block copolymer. Advantageously, the thermoplastic elastomer has greater than 50 percent by weight styrene monomer.

22 Claims, No Drawings

POLYOLEFIN MATERIALS HAVING ENHANCED SURFACE DURABILITY

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

FIELD OF THE INVENTION

This invention relates to polyolefin blends which have superior scratch resistance along with rigidity and impact toughness. The invention also relates to shaped articles made from these blends as well as methods for producing such articles.

BACKGROUND OF THE INVENTION

In numerous applications, such as many in the automotive industry, a polymeric material that exhibits a good level of scratch resistance balanced with rigidity and impact toughness is desired. These properties tend to vary, however, such that efforts to enhance one will often result in deterioration of one, or both, of the others.

Polypropylene blends are useful in a wide variety of applications due to their strength, environmental resistance and processability. While highly crystalline polypropylene does exhibit good mar and scratch resistance, it does not possess the impact toughness required in many important applications such as the making of automobile parts. Special polymeric materials have been developed that overcome this problem to some degree.

Attempts to remedy polypropylene's deficiency in impact toughness by blending with impact modifying copolymers of ethylene and other α-olefins, terpolymers of ethylene, other α-olefins, and dienes have not been completely successful. Elastomer modified polypropylene blends, also known as thermoplastic polyolefins (TPO), have the advantage of improved toughness, especially for cold temperature impact. They are widely used for formed or shaped articles such as automotive parts, toys, furniture, and housing products. Although the impact toughness of those compositions is improved by these modifiers, the scratch resistance has been found to decrease. That is, the scratch resistance of polypropylene blends containing impact modifiers such as ethylene-propylene copolymers, ethylene-propylene terpolymers, ethylene-butene copolymers, or ethylene-octene copolymers is poor. Increasing the crystallinity of the polypropylene to obtain a harder surface, and/or adding hard mineral filler to these blends, has been attempted as a countermeasure without complete success.

One conventional method to enhance surface characteristics is to use inorganic particulate material. Uniform dispersion of these particulates is difficult to achieve, however, and this results in non-uniform surface properties in such products. The use of these particulates also tends to damage other desirable physical properties of the polyolefin, resulting in loss of impact strength and/or toughness, and contributes to stress whitening which is not desirable.

Another conventional way to enhance surface characteristics of various articles is to apply acrylic polymers or coatings to an article and subsequently cure the polymer or coating with a radiation source, such as ultraviolet radiation.

A method to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 microns. The surface altering agent is preferably prepared by an endopolymerization, which is used with a compatible polyolefin to be altered.

Despite these prior art formulations, there remains a need to obtain polymeric materials which have a good level of mar/scratch resistance along with the physical property requirements of rigidity, strength, processability, and low temperature impact toughness.

SUMMARY OF THE INVENTION

This invention relates to compositions of thermoplastic polymer blends and formed articles made thereof, which exhibit superior physical properties such as a combination of excellent scratch resistance, rigidity and impact toughness.

The thermoplastic polyolefin blend includes from about 40 percent to about 80 percent of a base component of propylene-containing polymer; from about 5 percent to about 30 percent of a toughening component; and from about 3 percent to about 40 percent of a thermoplastic elastomer, preferably a styrene block copolymer, a random copolymer of styrene and ethylene, or mixtures thereof. A preferred thermoplastic polyolefin blend includes between about 50 percent to about 70 percent of the base component; between about 10 percent to about 20 percent of the toughening component; and between about 5 percent to about 20 percent of the thermoplastic elastomer.

The thermoplastic elastomer is advantageously a high-styrene polymer, containing at least about 50 percent styrene, preferably at least about 60 percent styrene, and more preferably at least about 70 percent styrene. The propylene-containing polymer may be a crystalline or semi-crystalline polypropylene, a copolymer of propylene and another α-olefin, or a mixture thereof. Preferably, the propylene-containing polymer is a crystalline or semi-crystalline homopolymer of polypropylene.

The toughening component may be a copolymer of ethylene and a first α-olefin, for example a copolymer of ethylene and I-octene; a terpolymer of ethylene, a second α-olefin, and/or at least one diene; or a mixture thereof. The first α-olefin, the second α-olefin, or both, are advantageously selected from the group consisting of propene, 1-butene, 1-hexene and 1-octene. The diene is advantageously selected from, for example, 1,4-hexadiene, cyclooctadiene, ethylidene norbornene, dicyclopentadiene, or mixtures thereof.

Examples of styrene block copolymers that are useful in this invention include styrene-(ethylene-butene)-styrene, styrene-(ethylene-propylene)-styrene, styrene-isoprene-styrene, styrene-isoprene, styrene-butadiene, styrene-butadiene-styrene, or mixtures thereof. The quantity of styrene in the block polymer is preferably at least 60 percent by weight of the block polymer.

Advantageously, the thermoplastic polyolefin blend further includes up to about 20 percent of polyethylene. Preferably, the polyethylene is high-density polyethylene and the high-density polyethylene is present in an amount between about 2 percent to about 18 percent, more preferably between about 5 percent to about 15 percent of polyethylene.

The thermoplastic polyolefin composition blend may advantageously also contain a filler in an amount of up to about 30 percent, preferably between about 2 and about 20 percent by weight of the entire composition. The fillers can be inorganic fillers or polymeric fillers such as polystyrene, polyamides, polyesters, polysulfones, polyether sulfones, polyphenylene oxides, or mixtures thereof.

This invention relates to thermoplastic polymer blends and shaped articles made therefrom, which exhibit superior physical properties such as a combination of excellent scratch resistance, rigidity and impact toughness. Such blends contain polyolefin homopolymers and copolymers and copolymers of styrene and α-olefins. The blend of polypropylene and olefins rubber with the addition of styrene copolymers and high-density polyethylene to conventional polyolefin blends enhances the scratch resistance of the substrate surface without sacrificing other physical properties such as rigidity and toughness.

BRIEF DESCRIPTION OF THE SEVERAL VIEWS OF THE DRAWINGS

Not Applicable

DETAILED DESCRIPTION OF THE INVENTION

As used herein, the term "percent" refers to weight percent of a polymer in the polymeric portion of a composition or blend. When applied to inorganic fillers, the term percent refers to weight percent of the entire composition, including both the polymeric portion and the inorganic filler portion.

As used herein, the term "polymer" includes homopolymers, copolymers, terpolymers, and the like.

As used herein, the term "semi-crystalline" means that the crystallinity is at least about 30 percent, and preferably is about 50 percent or greater, as determined by x-ray diffraction or solvent extraction. As used herein, the term "crystalline" means that the crystallinity is at least about 60 percent as determined by x-ray diffraction or solvent extraction.

This invention relates to compositions of thermoplastic polymer blends and formed articles made thereof, which exhibit superior physical properties such as a combination of excellent scratch resistance, rigidity and impact toughness.

The thermoplastic polymer blends of this invention include olefinic components that can be a combination of crystalline or semi-crystalline polypropylenes, crystalline polyethylene, amorphous poly-α-olefins and copolymers of styrene.

The olefinic blends useful in the process and composition of this invention are generally described as thermoplastic olefin blends. These thermoplastic olefin blends include various combinations of: a base component of a polypropylene or a copolymer of propylene and another α-olefin; a component of a polyethylene; a toughening component of a copolymer of ethylene and another α-olefin or a terpolymer of ethylene, another α-olefin and a diene. Examples of these blends can be found in, for example, U.S. Pat. No. 4,945,005, U.S. Pat. No. 4,997,720 and U.S. Pat. No. 5,498,671, the disclosures of which are expressly incorporated herein by reference. To these blends is added a styrenic block copolymer and/or random copolymer of styrene and ethylene, wherein the quantity of styrene monomer in the block copolymer and in the random copolymer of styrene and ethylene is at least 50 percent by weight, preferably at least 60 percent by weight, and more preferably at least 70 percent by weight.

The base component is a polypropylene or a copolymer of propylene and ethylene. The copolymer should contain at least about 60 percent propylene.

These base component α-olefins can be added either as homopolymers or as mixed copolymers, random copolymers, block copolymers, and the like. That is, when a copolymer of propylene and ethylene is utilized as the polypropylene component, the copolymer can either be a random or block copolymer or a graft copolymer. It is preferred, however, that the base component polymers be crystalline or semi-crystalline. One of ordinary skill in the art will readily understand that the selection, concentration, and distribution of olefinic monomers affects crystallinity, and can therefore provide the desired degree of crystallinity without undue experimentation.

Polypropylene homopolymers are preferred for the base component. Suitable types of homopolymers of propylene include highly isotactic polypropylenes. The preferred co-monomer for a propylene-containing co-polymer is ethylene, due in part to its low cost and ready availability. The polypropylene component of the present invention includes conventional polypropylenes having melt flow rates (ASTM D-1238 Condition L @ 230° C.) of desirably from about 0.1 to about 200 and preferably from about 10 to 100. Polypropylenes having melt flow rates in this range can be blended effectively with the other components to produce polymer compositions that can be effectively molded or extruded, or otherwise shaped.

This base component, containing crystalline and/or semi-crystalline homopolymers of propylene or copolymers of propylene with ethylene and other α-olefins, is present in the blend in an amount between about 40 percent to about 80 percent, preferably between about 50 percent to about 70 percent.

Another component that may be present in the thermoplastic olefin blends of this invention is polyethylene. Either high-density polyethylene or low density polyethylene can be used. High-density polyethylene is preferred. The addition of high-density polyethylene in polypropylene blends significantly influences the morphology of polymer phases, and results in a much improved mar and scratch resistant surface. The melt index of the polyethylene component is typically between about 0.1 and 20. This polyethylene component, containing crystalline and/or semi-crystalline homopolymers of ethylene, is present in the blend in an amount of up to about 20 percent, preferably between about 2 percent to about 18 percent, more preferably between about 5 percent and about 15 percent.

The next component of the thermoplastic olefin blends of this invention is a toughening component. This toughening component may include a copolymer of ethylene and another α-olefin; a terpolymer of ethylene, at least one other α-olefin and at least one diene; or mixtures thereof. The toughening components may be amorphous or semi-crystalline. Semi-crystalline is preferred.

The random noncrystalline copolymer of two or more α-olefins, such as copolymers of ethylene and propylene, are rubbery. Suitable α-olefins present in this toughening component, besides the ethylene already named, can include any $C_3$ to $C_{18}$ olefin, preferably a $C_4$ to $C_{10}$ olefin. For example, propene, 1-butene, 1-hexene and 1-octene are useful. In some embodiments, a copolymer or terpolymer containing ethylene and 1-octene are preferred.

The toughening component useful in the practice of the invention will typically include from about 30 to about 90 weight percent, preferably from about 40 to about 80 weight percent, and more preferably from about 50 to about 70 weight percent of ethylene and from about 10 to about 70 weight percent, preferably from about 20 to about 60 weight percent, and more preferably from about 30 to about 50 weight percent of a second α-olefin.

The terpolymer refers to a noncrystalline rubbery copolymer of two or more α-olefins, such as ethylene and 1-octene, and a lesser quantity of a nonconjugated diene. Suitable nonconjugated dienes include straight chain dienes such as 1,4-hexadiene; cyclic dienes such as cyclooctadiene; and bridged cyclic dienes such as ethylidene norbornene. When dienes are used, any $C_4$ to $C_{18}$ alkene can be used. A preferred diene for use in such terpolymers is ethylidene norbornene.

The terpolymer toughening component useful in the practice of the invention will typically include from about 30 to about 90 weight percent, preferably from about 40 to about 80 weight percent, and more preferably from about 50 to about 70 weight percent of a first α-olefin (i.e., ethylene); typically from about 10 to about 70 weight percent, preferably from about 20 to about 60 weight percent, and more preferably from about 30 to about 50 weight percent of a second α-olefin, and typically from about 0.5 to about 20 weight percent, preferably from about 1 to about 12 weight percent, and more preferably from about 3 to about 8 weight percent, of a non-conjugated diene. When a terpolymer is used, the amount of diene in the terpolymer in not critical and values as low as about 0.5 percent of diene are useful.

Compounds suitable as toughening components are commercially available from Exxon Chemical Americas of Houston, Tex., as VISTALON 703, 808 or 878; from Uniroyal Chemical Corp. of Middlebury, Conn., as ROYALENE 521 or 7565; and from Dupont Dow Elastomers of Wilmington, Del., as NORDEL. This toughening component improves the impact resistance of the blends.

The toughening component, containing copolymers of ethylene and another α-olefin or terpolymers of ethylene, another α-olefin, and a diene, is present in the blend in an amount between about 5 percent to about 30 percent, preferably between about 10 percent to about 20 percent.

The next component of the thermoplastic olefin blends of this invention is a thermoplastic elastomer. This component is preferably a styrenic block copolymer. The term "styrene block copolymer or styrenic block copolymer" means an elastomer having at least one block segment of a styrenic monomer in combination with saturated or unsaturated rubber monomer segments.

Polypropylene has excellent scratch resistance since its high crystallinity makes deformation of the surface difficult. The scratch resistance is, however, compromised with the addition of olefinic copolymers, which are necessary for the toughening of polypropylene-based materials, especially in a low temperature environment. Styrenic block copolymers of high styrene content exhibit balanced scratch resistance and impact properties at low temperature and good compatibility with polypropylene. Furthermore, the addition of high-density polyethylene in polypropylene blends significantly influences the morphology, dispersion and distribution of polymer phases, which results in the scratch resistance of the material surface. Therefore, combination of above components yields a thermoplastic resin with excellent balance of scratch resistance, stiffness, and impact resistance.

Acceptable styrenic block copolymers, also called styrene block copolymers, include, but are not limited to, copolymers of styrene, ethylene and another alkene. Exemplary copolymers include styrene-(ethylene-butene)-styrene (SEBS), styrene-(ethylene-propylene)-styrene (SEPS), styrene-(ethylene-butene), styrene-(ethylene-propylene), styrene-isoprene-styrene, styrene-isoprene, styrene-butadiene, styrene-butadiene-styrene (SBS), styrene-isoprene, α-methylstyrene-isoprene-α-methylstyrene, α-methylstyrene-butadiene-α-methylstyrene, and hydrogenated variations thereof. The structure of the styrene block copolymers useful in the present invention can be of the linear or radial type, and of the di-block or tri-block type. The quantity of styrene in the styrenic block copolymer should be at least 50 percent by weight, preferably at least 60 percent by weight, more preferably at least 70 percent by weight. Styrene block copolymers are available from Shell Chemical of Houston, Tex. under the trademark KRATON, from Phillips Petroleum Co., Inc. of Bartlesville, Okla. under the trademark K-RESIN, and from Asahi Chemical Co.

The addition of styrenic copolymers and high-density polyethylene enhances the scratch resistance of the polypropylene without sacrificing other physical properties such as rigidity and impact toughness.

Styrenic block copolymers, such as SEBS and SBS, of high styrene content are particularly preferred. The term "high styrene" means the styrenic block copolymer contains at least about 50 percent styrene, preferably at least about 60 percent styrene, and more preferably at least about 70 percent styrene. The particular SEBS used in Examples 1, 2, and 3 contains about 70 percent styrene. These high styrene copolymers modify the blend to exhibit balanced scratch resistance and impact properties at low temperature, and also good compatibility with polypropylene. The higher content of styrene in the styrenic copolymer gives the thermoplastic olefin blend the desirable high stiffness.

The styrenic block copolymer component, containing one or more of, for example, SEBS, SEPS, SEE, SEP, or SBS, is present in an amount between about 5 percent to about 40 percent, more preferably from about 8 percent to about 22 percent, most preferably from about 10 percent to about 20 percent of the thermoplastic polyolefin blend.

A random styrenic copolymer of ethylene and styrene may be used in place of, or in addition, to the styrenic block copolymer. The quantity of styrene in the random styrenic copolymer should be at least 50 percent by weight, preferably at least 60 percent by weight, more preferably at least 70 percent by weight. It is particularly preferred that the random styrenic copolymer of ethylene and styrene have a blocky comonomer distribution. By blocky comonomer distribution it is meant that there are more repeating monomer units than would be expected in a random distribution. Such a distribution would be provided by a random distribution of blocks of a plurality of monomer units. This type of polymer can be manufactured by single-site catalysis, i.e., metallocene or single-site non-metallocene catalysis. The random styrenic copolymer containing ethylene and styrene is present in an amount between about 5 percent to about 40 percent, more preferably from about 8 percent to about 22 percent, most preferably from about 10 percent to about 20 percent of the thermoplastic polyolefin blend.

In one embodiment of the invention, the thermoplastic olefin blend of this invention is admixed with one or more fillers, particularly hard inorganic fillers. The aforementioned compositions can be blended with fillers such as talc, calcium carbonate, wollastonite, clay, zinc oxide, titanium oxide and dioxide, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, and/or carbon fiber. These reinforcing minerals provide property enhancement, particularly hardness.

The filler component, containing one or more of the above-listed fillers or other suitable fillers, may be present in an amount of up to about 30 percent, more preferably from about 2 percent to about 20 percent of the entire composition.

In another embodiment of the invention, the thermoplastic olefin blend of this invention is blended with one or more high polymers, such as polystyrene, polyamides, polyesters, polysulfones, polyether sulfones, and polyphenylene oxides. These blends offer excellent mechanical properties and surface mar and scratch durability. These high polymers, for example one or more of the above-listed polymers, may be present in an amount between about 2 percent to about 20 percent.

In another embodiment of the invention, the thermoplastic olefin blend of this invention is blended with one or more additives, for example an internal lubricant, gloss reducer, or other stabilizers for process and color stability. These additives can in some cases further improve mar and scratch performance. These additives may be present in an amount up to about 5 percent. When used, these additives are present in an amount of at least about 0.1 percent.

These blends surprisingly exhibit superior levels of scratch resistance along with high levels of impact toughness and rigidity previously unobtainable in the art.

The materials of this invention may be prepared by a single step mixing process using a batch mixer such as the Banbury type or an intensive mixing twin-screw extruder. Multi-step mixing process can also be employed to control the property enhancement. The thermoplastic olefin blends may be prepared and then pelletized for storage or shipment.

The novel compositions of this invention can be easily processed into shaped articles by injection molding, profile extrusion, blow molding and other forming processes and can give products which have well balanced properties in mar and scratch resistance, stiffness and impact resistance.

These thermoplastic olefin blends exhibit excellent scratch resistance along with high levels of impact toughness and rigidity previously unobtainable in the art. The thermoplastic olefin blends and articles with enhanced surface mar and scratch resistance in this invention are comprised of the following components: semi-crystalline homopolymers of propylene or copolymers of propylene with ethylene and other α-olefins; optionally, semi-crystalline homopolymers of ethylene; semi-crystalline copolymers or terpolymers of ethylene where comonomers are α-olefins and the terpolymer also includes a diene; thermoplastic elastomer comprising of styrenic block copolymer such as SEBS, SEPS, SEB, SEP, SBS, or mixtures thereof with a high percentage of styrene; optionally, a mineral filler; and optionally, other processing aids, stabilizers, colorants, lubricants, and other additives.

[SECTION] [s4]

EXAMPLES

These and other aspects of the present invention may be more fully understood with reference to the following examples, which are merely illustrative of preferred embodiments of the present invention and are not to be construed as limiting the invention.

A test was developed to measure relative surface scratch resistance. The test specimens are at least 100 mm×100 mm in dimensions, with a hole drilled in the middle for mounting. A Taber Abrasion test machine (described further in ASTM D1044) was modified by substituting a stainless steel slider with a sharp tip (radius=0.25 mm) in place of the sanding wheels to scratch the surface of the specimens. With the tip offset 34 mm from the center of rotation and the turntable spinning at 72 rpm, the actual sliding velocity is equal to 25 mm/sec, which is similar to the condition of someone scratching a surface at normal speed with a fingernail. The test is terminated after one single revolution. The normal load used for this test is 1 lb (453.6 g). Upon completion of the test, the specimens are then related to visually on a numerical scale of 1 to 5 where: "1" is no visible mar or scratch; "2" is a barely visible mar/scratch from a distance of less than 3 ft.; "3" is a visible mar/scratch from 3 ft. away; "4" is a clearly visible mer/scratch with stress whitening; "5" is a badly gouged surface with deep scratches and stress-whitening clearly visible.

The width of the wear track and the characteristics of the failure surface can also be further studied with an optical microscope or more sophisticated instruments such as surface profilometer and scanning force microscope. The typical dimensions of the wear paths corresponding to the mar ratings are as follows:

| Mar Rating | Width of Scratch ($\mu$m) | Relative Performance |
| --- | --- | --- |
| 1 | <50 | Excellent |
| 1.5 | 50–200 | Very good |
| 2 | 200–300 | Good |
| 3 | 300–400 | Fair |
| 4 | 400–500 | Bad |
| 5 | >500 | Poor |

A value of 1.5 or less in this test is indicative of very good or excellent performance. Preferred polyolefin blends of this invention have a mar rating of 2 or less, corresponding to a 0.25 millimeter radius point under a one pound load traveling at 25 millimeters per second forming a groove with a width of about 0.3 millimeters or less. More preferred polyolefin blends of this invention have a mar rating of 1.5 or less, corresponding to a 0.25 millimeter radius point under a one pound load traveling at 25 millimeters per second forming a groove with a width of about 0.2 millimeters or less.

The invention is further defined by reference to the following examples describing in detail the preparation of the compositions of the present invention. It will be apparent to those of ordinary skill in the art that many modifications, both to materials and methods, may be practiced without departing from the purpose and intent of this invention.

[SECTION] [s1]

Examples 1 to 3

Examples 1 to 3 are set forth in Table 1 below. Each of the examples on this table was made with varying levels of the same components. The antioxidant and color concentrate do not appreciably affect the short term properties, and in any case are present in equal quantities in each sample and control.

The first two columns, labeled Prior Art 1 and 2, are prior art formulations. Prior art No. 1 is simply polypropylene. Polypropylene has excellent scratch and mar resistance, but it is brittle in the Dynatup Impact test at −15° C. (ASTM D-3763), and exhibits complete break in the Izod Impact test at ambient temperature (ASTM D-256). Adding a toughener, as in Prior art No. 2, provides adequate ductility in the Dynatup Impact test and no break in the Izod impact test, but provides extremely poor scratch resistance.

Example 1 has polypropylene, the toughener at only 10 percent, and 20 percent of the high styrene block polymer SEBS. This sample provides adequate ductility in the Dynatup Impact test and no break in the Izod impact test, and provides excellent scratch resistance, as well as improved tensile yield strength.

Examples 2 and 3 show the effect of reducing the toughener to 5 percent, while maintaining the 20 percent SEBS. The examples exhibited partial break in the Izod Impact test, but did not exhibit a total break as did the polypropylene homopolymer, and exhibited excellent scratch resistance.

TABLE I

|  | Prior art 1 | Prior art 2 | Ex. 1 | Ex. 2 | Ex. 3 |
| --- | --- | --- | --- | --- | --- |
| Polypropylene (32 MFR), % | 100 | 70 | 70 | 72.5 | 75 |
| Ethylene/1-octene copolymer, % |  | 30 | 10 | 7.5 | 5 |
| SEBS, % |  |  | 20 | 20 | 20 |
| Additives[1], % | 2.4 | 2.4 | 2.4 | 2.4 | 2.4 |
| Test Results: |  |  |  |  |  |
| Melt Flow, 230/2.16 | 32 | 13.4 | 17.1 | 17.8 | 18.2 |
| Tensile Yield Strength, psi | 4950 | 2800 | 3360 | 3510 | 3570 |
| Elongation to Break, % | 1100 | 1500 | 1380 | 1410 | 1400 |
| Flexural Modulus, kpsi | 200 | 124 | 161 | 169 | 171 |
| Dynatup Impact @ −15° C.[2] | Brittle | Ductile | Ductile | Ductile | Ductile |
| Izod Impact @ RT, ft-lb/in[3] | CB | NB | NB | PB | PB |
| SEP Mar Resistance[4] | 1.5 | 5 | 2 | 2 | 1.5 |

[1]Anti-oxidant B-225, 0.4 percent, and color concentrate, 2 percent
[2]Dynatup impact test (ASTM D-3763)
[3]Izod Impact Test (ASTM D-256): CB = complete break; PB = partial break; NB = non-break
[4]Mar Resistance (SEP internal test method): "1" = no visible mar or scratch; "2" = barely visible mar/scratch from a distance of less than 3 ft.; "3" = visible mar/scratch from 3 ft. away; "4" = clearly visible mar/scratch with stress whitening; "5" = badly gouged surface with deep scratches and stress whitening clearly visible.

[SECTION] [s2]

Examples 4 to 6

Examples 4 to 6, and prior art example 3, are set forth in Table II below. Each of the examples on this table was made with varying levels of the same components. Note that the polypropylene used in these samples had a MFR of 30, as opposed to the polypropylene in Examples 1 to 3 that had a MFR of 32.

TABLE II

|  | Prior art 3 | Ex. 4 | Ex. 5 | Ex. 6 |
| --- | --- | --- | --- | --- |
| Polypropylene (30 MFR), % | 80 | 70 | 70 | 70 |
| High-density polyethylene (8 MI), % |  | 10 | 10 | 10 |
| Ethylene/1-octene copolymer, % | 20 | 20 |  | 10 |
| SEBS, % |  |  | 20 | 10 |
| Additives[1], % | 2.4 | 2.4 | 2.4 | 2.4 |
| Test Results |  |  |  |  |
| Melt Flow, 230/2.16 | 20.1 | 19 | 27.1 | 21.8 |
| Tensile Yield strength, psi | 3300 | 3200 | 4000 | 3500 |
| Elongation to Break, % | 870 | 580 | 760 | 1520 |
| Flexural Modulus, kpsi | 154 | 136 | 199 | 154 |
| Dynatup Impact @ −15° C.[2] | Ductile | Ductile | Brittle | Ductile |
| Izod Impact @ RT, ft-lb/in[3] | CB | PB | CB | PB |
| SEP Mar Resistance[4] | 4 | 3.5 | 1.5 | 2 |

[1]Anti-oxidant B-225, 0.4 percent, and color concentrate, 2 percent
[2]Dynatup impact test (ASTM D-3763)
[3]Izod Impact Test (ASTM D-256): CB = complete break; PB = partial break; NB = non-break
[4]Mar Resistance (SEP internal test method): "1" = no visible mar or scratch; "2" = barely visible mar/scratch from a distance of less than 3 ft.; "3" = visible mar/scratch from 3 ft. away; "4" = clearly visible mar/scratch with stress whitening; "5" = badly gouged surface with deep scratches and stress whitening clearly visible.

The antioxidant and color concentrate do not appreciably affect the short term properties, and in any case are present in equal quantities in each sample and control.

Prior art example No. 3 contains propylene and 20 percent of a toughener, an ethylene-1-octene copolymer. Like prior art example No. 2, this sample has poor scratch resistance. Example 4 adds 10 percent high-density polyethylene to the composition that contains propylene and 20 percent of a toughener. This sample was ductile in the Dynatup impact test, but exhibited a partial break in the Izod impact test and had poor scratch resistance. Example 4 has no SEBS. When, as shown in Example 5, a composition has 20 percent high-styrene SEBS, the scratch resistance was excellent. However, Example 5 had no toughener, and this leads to poor performance in the Dynatup and Izod impact tests.

Example 6 has 10 percent each of high-density polyethylene, high-styrene SEBS, and the toughener. This sample has excellent mechanical properties, though the example did exhibit a partial break in the Izod impact test.

[SECTION] [s3]

Examples 7 to 10

Examples 7 to 10, and prior art example 4, are set forth in Table III below. Each of the examples on this table was made with varying levels of the same components. Prior art sample 4 contained 20 percent of the entire composition of toughener and 20 percent of talc filler. This sample had poor scratch resistance and exhibited a partial break in the Izod impact test. Examples 7 to 10 each contain 20 percent of a polystyrene filler and 10 percent of the entire composition of high-styrene SEBS. Examples 8, 9, and 10 clearly show the advantage, with respect to scratch resistance and impact resistance, of having high-density polyethylene and a toughener along with the high-styrene SEBS.

TABLE III

| | Prior art 4 | Ex. 7 | Ex. 8 | Ex. 9 | Ex. 10 |
|---|---|---|---|---|---|
| Polypropylene (30 MFR), % | 60 | 60 | 50 | 50 | 50 |
| High-density polyethylene (8 MI), % | | | | 10 | 5 |
| Ethylene/1-octene copolymer, % | 20 | 10 | 10 | 15 | 20 |
| SEBS, % | | | 10 | 10 | 10 | 10 |
| Talc, % | 20 | | | | |
| Polystyrene, % | | | 20 | 20 | 20 | 20 |
| Additives[1], % | 2.4 | 2.4 | 2.4 | 2.4 | 2.4 |
| Test Results | | | | | |
| Melt Flow, 230/2.16 | 15.6 | 25.1 | 24.3 | 20.5 | 17.2 |
| Tensile Yield Strength, psi | 3300 | 3600 | 3400 | 3200 | 3000 |
| Elongation to Break, % | 910 | 330 | 500 | 620 | 630 |
| Flexural Modulus, kpsi | 277 | 189 | 179 | 154 | 137 |
| Dynatup Impact @ −15° C.[2] | Ductile | Brittle | Ductile | Ductile | Ductile |
| Izod Impact @ RT, ft-lb/in.[3] | PB | CB | CB | NB | NB |
| SEP Mar Resistance[4] | 3.5 | 2 | 1.5 | 2 | 2.5 |
| Stress Whitening | Yes | No | No | No | No |

[1]Anti-oxidant B-225, 0.4 percent, and color concentrate, 2 percent
[2]Dynatup impact test (ASTM D-3763)
[3]Izod Impact Test (ASTM D-256): CB = complete break; PB = partial break; NB = non-break
[4]Mar Resistance (SEP internal test method): "1" = no visible mar or scratch; "2" = barely visible mar/scratch from a distance of less than 3 ft.; "3" = visible mar/scratch from 3 ft. away; "4" = clearly visible mar/scratch with stress whitening; "5" = badly gouged surface with deep scratches and stress whitening clearly visible.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments which would come within the spirit and scope of the present invention.

Deposit of Computer Program Listings

Not Applicable

What is claimed is:

1. A thermoplastic polyolefin blend comprising:
   from about 40 percent to 80 percent of a base component of propylene-containing polymer, wherein the propylene-containing polymer is a crystalline or semi-crystalline polypropylene, a copolymer of ethylene and propylene comprising at least about 60 percent propylene, or mixture thereof;
   from about 5 percent to about 30 percent of a toughening component; and
   from about 3 percent to about 40 percent of a thermoplastic elastomer comprising a styrenic block copolymer other than hydrogenated polystyrene-polyisoprene-polystyrene, a copolymer of styrene and ethylene having a blocky comonomer distribution, or a mixture thereof, wherein the thermoplastic elastomer contains greater than 50 percent by weight styrene monomer.

2. The thermoplastic polyolefin blend of claim 1 wherein the base component is present in an amount between about 50 percent to about 70 percent, the toughening component is present in an amount between about 10 percent to about 20 percent, the thermoplastic elastomer is a styrenic block copolymer that contains at least about 60 percent by weight styrene monomer and is present in an amount between about 5 percent to about 20 percent.

3. The thermoplastic polyolefin blend of claim 1 wherein the base component is present in an amount between about 50 percent to about 70 percent, the toughening component is present in an amount between about 10 percent to about 20 percent, the thermoplastic elastomer contains at least about 60 percent by weight styrene monomer and is present in an amount between about 5 percent to about 20 percent.

4. The thermoplastic polyolefin blend of claim 1 further comprising polyethylene in an amount of up to about 20 percent, and wherein the propylene-containing polymer is a crystalline or semi-crystalline homopolymer or copolymer of polypropylene.

5. The thermoplastic polyolefin blend of claim 1 wherein the toughening component comprises a copolymer of ethylene and a first α-olefin; a terpolymer of ethylene, a second α-olefin, and at least one diene; or a mixture thereof.

6. The thermoplastic polyolefin blend of claim 5 wherein the first α-olefin, the second α-olefin, or both, are selected from the group consisting of 1-propene, 1-butene, 1-hexene and 1-octene.

7. The thermoplastic polyolefin blend of claim 5 wherein the toughening component comprises a copolymer of ethylene and 1-octene or 1-butene, a terpolymer of ethylene, a second α-olefin, and a diene, or a mixture thereof, and wherein the diene is selected from 1,4-hexadiene, cyclooctadiene, ethylidene norbornene, dicyclopentadiene, or mixtures thereof.

8. The thermoplastic polyolefin blend of claim 1 wherein the thermoplastic elastomer has a blocky comonomer distribution, and wherein a 0.25 millimeter radius point under a one pound load traveling at about 25 millimeters per second on the surface of the set blend forms a groove that has a width of no greater than about 0.3 millimeters.

9. The thermoplastic polyolefin blend of claim 8 wherein the 0.25 millimeter radius point under a one pound load traveling at about 25 millimeters per second on the surface of the set blend forms a groove having a width of no greater than about 0.2 millimeters.

10. The thermoplastic polyolefin blend of claim 1 wherein the thermoplastic elastomer is a styrenic block copolymer having greater than at least 60 percent styrene monomer, and wherein a 0.25 millimeter radius point under a one pound load traveling at about 25 millimeters per second on the surface of the set blend forms a groove that has a width of no greater than about 0.3 millimeters.

11. The thermoplastic polyolefin blend of claim 10 wherein the styrenic block copolymer has greater than at least 70 percent styrene monomer, and wherein a 0.25 millimeter radius point under a one pound load traveling at about 25 millimeters per second on the surface of the set blend forms a groove that has a width of no greater than about 0.2 millimeters.

12. The thermoplastic polyolefin composition blend of claim 1 further comprising an inorganic filler which is present in an amount up to about 30 percent.

13. The thermoplastic polyolefin composition blend of claim 1 further comprising a polymeric filler which is present in an amount of up to about 30 parts per hundred parts of the blend and filler, and wherein the filler comprises one or more of polystyrene, polyamides, polyesters, polysulfones, polyether sulfones, and polyphenylene oxides.

14. The thermoplastic polyolefin composition blend of claim 1, wherein the tensile yield strength is between about 3300 psi and about 4000 psi, the flexural modulus is between about 150 kpsi and about 200 kpsi, and the elongation to break is at least about 500 percent.

15. The thermoplastic polyolefin blend of claim 1, wherein the thermoplastic elastomer comprises at least about 70 percent by weight styrene monomer.

16. The blend of claim 1, wherein the thermoplastic elastomer comprises a copolymer of styrene, ethylene, and another alkene.

17. The blend of claim 1, wherein the block copolymer is linear or radial and of the di-block or tri-block type.

18. The blend of claim 1, wherein the copolymer comprises at least one of styrene-(ethylene-butene)-styrene (SEBS), styrene-(ethylene-butene), styrene-(ethylene-propylene), styrene-butadiene, styrene-butadiene-styrene (SBS), α-methylstyrene-isoprene-α-methylstyrene, α-methylstyrene-butadiene-α-methylstyrene, and hydrogenated variations thereof.

19. The blend of claim 1, wherein the base component is present in an amount of about 60 to 80 percent, the toughening component is present in an amount of about 5 to 20 percent, and the thermoplastic elastomer is present in an amount of about 3 to 22 percent of the blend.

20. A thermoplastic polyolefin blend comprising:
   from about 40 percent to 80 percent of a base component of propylene-containing polymer, wherein the propylene-containing polymer is a crystalline or semi-crystalline polypropylene, a copolymer of ethylene and propylene comprising at least about 60 percent propylene, or mixture thereof;
   from about 5 percent to about 30 percent of a toughening component; and
   from about 3 percent to about 40 percent of a thermoplastic elastomer comprising a copolymer of styrene and ethylene having a blocky comonomer distribution, wherein the thermoplastic elastomer contains at least about 50 percent by weight styrene monomer.

21. The thermoplastic polyolefin blend of claim 20 wherein the copolymer of styrene and ethylene contains at least about 70 percent by weight styrene monomer.

22. A thermoplastic polyolefin blend comprising:
   from about 40 percent to about 80 percent of a base component of propylene-containing polymer, wherein the propylene-containing polymer is a crystalline or semi-crystalline polypropylene, a copolymer of ethylene and propylene comprising at least about 60 percent propylene, or mixture thereof;
   from about 5 percent to about 30 percent of a toughening component; and
   from about 3 percent to about 40 percent of a thermoplastic elastomer of a styrenic block copolymer, a copolymer of styrene and ethylene having a blocky comonomer distribution, or a mixture thereof, wherein the thermoplastic elastomer contains greater than 50 percent by weight styrene monomer; and
   from about 2 percent to about 18 percent high-density polyethylene.

* * * * *